April 7, 1931.  G. P. PHILLIPS  1,799,528
DENTAL RECORDER
Filed June 29, 1926  3 Sheets-Sheet 1

Inventor:
George P. Phillips,

April 7, 1931.   G. P. PHILLIPS   1,799,528
DENTAL RECORDER
Filed June 29, 1926    3 Sheets-Sheet 2
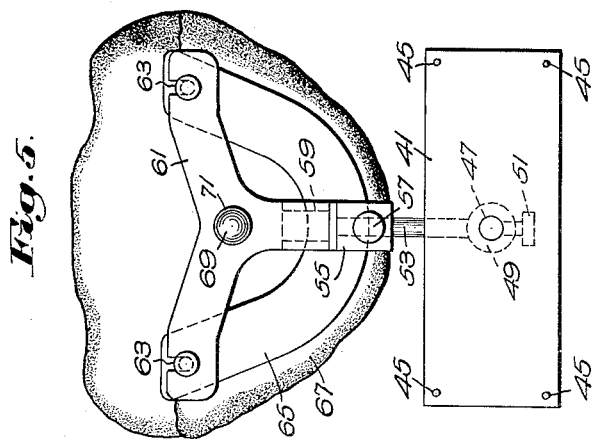
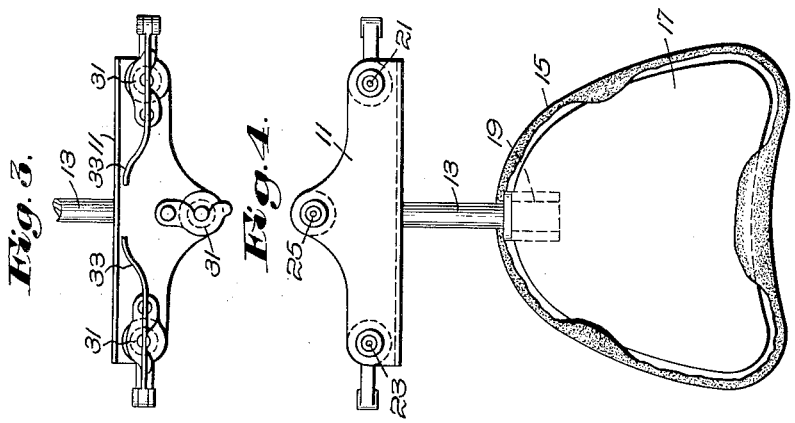
Inventor:
George P. Phillips April 7, 1931.  G. P. PHILLIPS  1,799,528
DENTAL RECORDER
Filed June 29, 1926  3 Sheets-Sheet 3

Inventor:
George P. Phillips,
by Emery Booth Janney & Varney
Attys.

Patented Apr. 7, 1931

1,799,528

UNITED STATES PATENT OFFICE

GEORGE P. PHILLIPS, OF BOSTON, MASSACHUSETTS

DENTAL RECORDER

Application filed June 29, 1926. Serial No. 119,335.

This invention relates to dentistry and consists in improved methods of and apparatus for determining the movements of a patient's jaw, preferably in such manner and by such means as permits those movements or positions to be accurately reproduced in a dental articulator.

The invention may have useful application for various purposes where the reproduction of the natural jaw movements may be desired, but herein for illustrative purposes it is described in connection with the making of artificial dentures.

In the illustrative embodiment of the invention here disclosed, by the aid of wax models or trial plates in the patient's mouth, or by means of other attachments connecting the recording devices to the patient's jaws, a record is produced of the extreme movements of the patient's jaw in both opposite directions from the centric position or position of rest. Such record contemplates not only a graphic record in plan of the lateral and longitudinal movements, but also a record, either graphic or otherwise, of the vertical displacement of the jaw in these extreme lateral movements. Means are provided for utilizing this record, not only in subsequently reproducing such movements with the jaws of an articulator, but also for initially installing the wax models or other supports in the articulator in their true centric relation as determined in the mouth of the patient.

The invention will be best understood by reference to the following description when taken in connection with the accompanying illustration of one specific embodiment thereof, while its scope will be more particularly pointed out in the appended claims.

In the drawings,—

Fig. 2 is a front elevation of the recorder applied to the same articulator;

Fig. 3 is a plan view of the parts comprising the recording unit;

Fig. 4 is a plan, viewed from below, of the same parts attached to the wax model for the upper jaw;

Fig. 5 is a plan view of the parts comprising the record-carrying unit attached to the wax model for the lower jaw;

Figure 1:
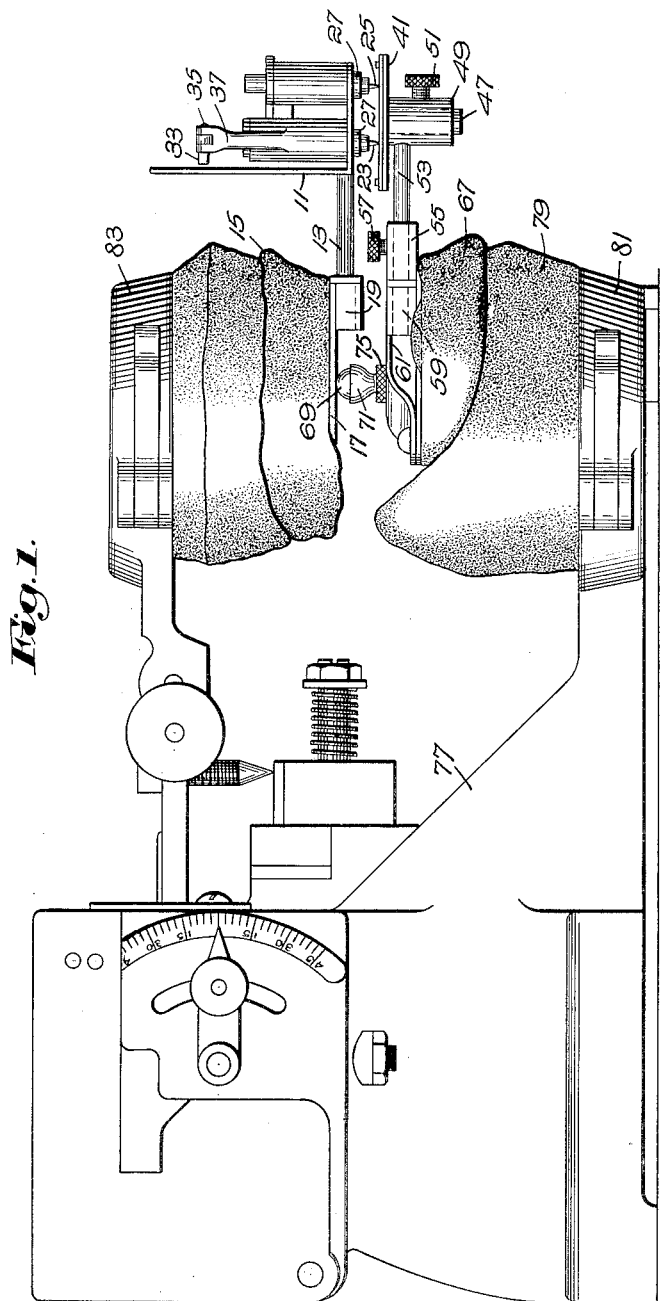
Fig. 1 is a side elevation of a conventional type of articulator, to which is shown applied a recording device embodying one form of the invention.
Figure 6:
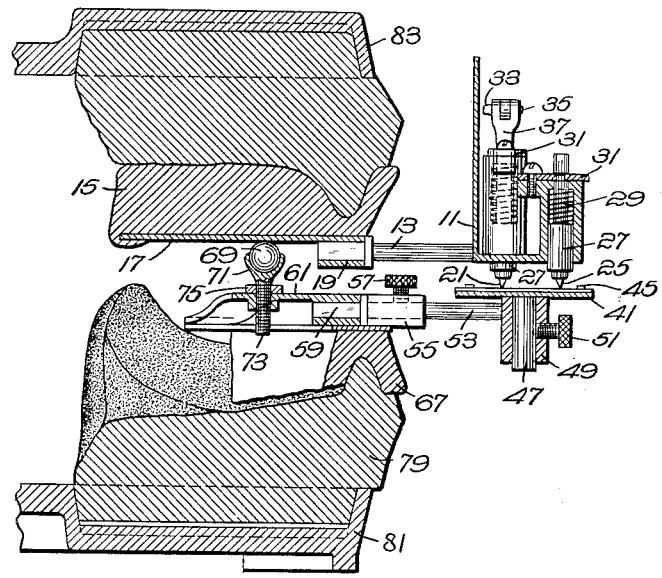
Fig. 6 is a sectional, longitudinal elevation taken through the wax models mounted in the jaws or arms of the articulator and equipped with the recording devices.

Referring to the drawings and to the embodiment which is there shown for illustrative purposes, the recording devices comprise a recording unit adapted to be secured to one of the two models or trial plates and a record-carrying unit adapted to be secured to the mating or opposite model. The recording unit may be applied to either one of the two models, but herein it is arranged to be attached to the model for the upper jaw and the record-carrying unit to the model for the lower jaw.

The recording unit (Figs. 1, 2, 3, 4 and 6) comprises a bracket 11 carried by an arm 13 which, when the recorder is applied to the wax model or trial plate 15, projects from the front thereof substantially along the median plane, thereby to position the recording devices in front of the mouth of the patient when the models are in the patient's mouth. The arm 13 is secured to the wax model in any suitable manner, as by attachment to a support, herein comprising a substantially flat plate 17, the edges of which are permanently molded into the under face of the model 15, as indicated in Fig. 4.

For convenience in removing the recording unit from its support, the arm 13 is secured to the plate 17 through engagement with a socket 19, the walls of the socket and the cooperating seating portion of the arm being preferably squared, or otherwise shaped, so that the recording unit will always be replaced on its support in the same relative position.

The bracket 11 carries one or more tracing points. In the illustrative embodiment of the invention, and for a purpose to be hereinafter described, these are three in number and comprise the two laterally positioned tracing points 21 and 23 and the intermediate tracer 25. Each tracing point is carried by a plunger 27, slidably mounted for vertical movement in an upright barrel-like formation carried by the bracket, each tracer being pressed downwardly by a light spring 29 confined between the end of the barrel bore and a necked-down portion of the plunger.

When the recorder is out of use, the plunger for each tracing point is held in a fixed position, preventing the escape of the plunger from its barrel and bringing the tracing points into substantially the same plane. This result is had by means of a pivoted latch 31 for each plunger mounted outside of and at the top of the barrel, each latch having a recess which is adapted to fit over a circumferential groove in the projecting end of the plunger and hold it fixed in position when the latch is swung about its pivot to engage therewith, as indicated in Fig. 3. When the recorder is in operation, as in recording movements of a patient's jaws or in adjusting the articulator, the latches 31 are swung back far enough each to disengage its respective plunger, so that the tracing points 21, 23 and 25, which then rest on the underlying record sheet, are permitted a free vertical movement as may be required in conforming to the movements of the model to which they are attached. When the record has been completed, or after the articulator has been adjusted, or at any time when the tracing points are separated from the record sheet, the tracers are locked up by means of the latches 31.

The true movement of the jaw is compounded of three components in the three planes of space, and the tracing points are qualified to make a graphic record on an underlying record sheet of the lateral and longitudinal movements in plan, these being shown by a diagram commonly known as the "Gothic arch". The vertical displacement of the jaw in these extreme lateral movements will be shown by the vertical displacement of the tracing points 21 and 23 and their plungers in relation to the fixed plane of the record sheet. Such vertical displacement might be automatically and graphically recorded if desired, but herein provision is made for indicating such displacement so that the indications may be noted and later utilized.

For the purpose of indicating the vertical displacement, the projecting ends of the plungers for the two lateral tracing points 21 and 23 (Figs. 2 and 3) are pivotally connected each to a pointer 33, which is fulcrumed at 35 on an arm 37 secured to the bracket, the tip of the pointer being adapted to travel over a graduated scale 39. The scale has its neutral or zero point at approximately its middle and the pointer preferably registers with the zero point when the tracers are locked by the latches 31. The displacement of the pointer above or below the neutral point on the scale accordingly represents the displacement of the jaw from the normal central occlusal plane, either in its extreme lateral position or in any intermediate position.

The record-carrying unit (Figs. 5 and 6) comprises a record support, herein consisting of a substantially flat plate 41, on which may be placed a piece of paper or other record sheet 43 (Fig. 7), held in place on its support by any suitable means, such as the small upright dowel or locating pins 45 engaging perforations in the sheet. The supporting plate 41 is fixedly mounted on the depending post or pin 47 adapted to be fixed in any desired position of vertical adjustment within a socket piece 49 by means of the set screw 51. The socket piece 49 is secured to the arm 53, adjustably held in the collar 55 by means of the set screw 57. The collar carries a squared or otherwise suitably formed end 59 which seats in a similarly shaped socket carried by the sheet metal frame 61. The frame 61 (see Fig. 5) has two lateral branches, the ends of which are slotted so that they may be slipped under and secured by the heads of the two projecting pins 63 carried by the supporting plate 65, the latter molded into the upper face of the wax model 67 so as to be fixed thereto.

The supporting parts of the record-carrying member are so positioned on the model 67 that when the latter is in the mouth of the patient the record-carrying member is held in front of the mouth of the patient with the record-carrying sheet presented to the three tracing points on the tracing unit.

In securing a record with the aid of this apparatus, it is necessary that there be maintained a definite vertical relationship between the models of the upper and lower jaws to establish or reproduce the horizontal plane of the teeth. This might be accomplished by building up the wax model to establish the occlusal plane, but as a convenient and more effective means of accomplishing it, and avoiding the danger of displacing the models through compression of the tissues, this is preferably accomplished by means of a bearing rest, such as is described in Patent No. 1,734,398, dated November 5, 1929. For this purpose, I have provided the ball bearing member 69 (Fig. 6) carried by the socket 71 having the threaded support 73 by which it may be vertically adjusted on the frame 61 and locked in any position of adjustment by the lock nut 75. The bearing rest 69 is located between opposite sides of the model rim so as to distribute the biting pressure evenly on the rim in all positions of the jaw.

In making use of the described recorder, the wax models 15 and 67 with the attached supporting plates 17 and 65 respectively are first placed in the patient's mouth. The frame 61 is then fixed in position on the supporting plate 65 for the lower model 67 and the bearing rest 69 vertically adjusted and locked by the nut 75 to establish the separation of the models. The recording unit is then attached to the upper model by fixing the arm 13 in the socket 19, the tracing points being still locked in fixed position by means of the latches 31. The record-carrying unit is then applied to the frame 61 by inserting the squared end 59 of the collar 55 in its socket. The record-carrying plate is then adjusted by means of the set screws 51 and 57 to bring it into proper relationship to, and in substantial coincidence with, the plane defined by the three tracing points, after which this adjustment is not again disturbed until after the models have subsequently been installed in the articulator and the recording device has there served its purpose. The latches 31 which lock the tracing points against vertical displacement are then moved to release the tracing points and the apparatus is ready for use.

Figure 7:
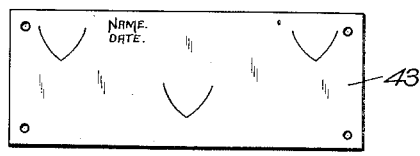
Fig. 7 is a plan view of a typical record.

In making the record, the patient is required to move his jaw from the centric position to opposite extreme lateral positions, this movement causing each tracing point to trace a record in plan of such movements, these appearing in the form of three "Gothic arches", such as are represented in Fig. 7. Ordinarily these movements are required to be repeated a number of times, until a patient moves his jaw freely, without constraint, and the normal or natural jaw movement is had. This may result in a record consisting of a number of overlapping and oppositely arranged arcs, the outside arcs being taken as representing the true path of extreme movement. This provides a graphic representation of the true path of the extreme jaw movement while the jaw is free and unconstrained and, starting from centric position, gives the extreme lateral and longitudinal positions without constraint.

Heretofore, where wax moulds have been employed to locate the extreme positions, it has been necessary to press the wax against the patient's jaws, tending to compress the tissues and creating a tendency to displace the jaw from its true extreme position. The unconscious resistance aroused in the patient also tends to cause the latter to force his jaw into a false extreme position.

In the production of the graphic record as described, the jaw moves with freedom and without constraint, tracing the true extreme path, while the reading of the right-hand pointer 33 on the scale 39 may be taken to indicate the vertical displacement of the jaw in the extreme right-hand position, and that of the left-hand pointer the vertical displacement of the jaw in the extreme left-hand position. Such displacements, or displacements for any other intermediate positions as desired, may be separately recorded.

Having secured the record, the record holding unit and the recording unit (with the tracing points first locked up) may be removed from the models, either with the latter or before withdrawing the models from the mouth of the patient. It will be observed that the record-carrying unit as a whole may be withdrawn from its support on the model by withdrawing its collar from the socket on the frame 61, or it may be withdrawn from the supporting plate 65 or replaced therein while still attached to the frame 61. In any event, however, the unit may always be replaced in the same relationship to the model which it initially had and the same is true of the recording unit with relation to the upper model 15. Accordingly, after the adjustments have been made by the set screws 51 and 57, the two units may be separated from their respective models and thereafter replaced therein at will, reestablishing, however, at all times the original relationship between the tracing points and the record sheet.

The record thus secured permits the described apparatus to be availed of to install the models in the articulator in the same centric position that they occupied in the mouth of the patient and also to adjust the articulator to reproduce the recorded movements. In the drawings (Figs. 1, 2 and 6), I have shown an articulator 77 of the general type shown in Patent No. 1,666,022, dated April 10, 1928, but this is illustrative only of any conventional articulator, and the hereinbefore described method and apparatus may be usefully employed with articulators of any usual construction.

In installing the models in the articulator, the lower model 67 is first mounted in a plaster base 79 molded in the lower arm or support 81 of the articulator. The record-carrying unit with its supporting frame 61 and the bearing rest 69 are then placed in position on the model 67, occupying thereon the relative position which they had when the record was made. The upper model 15 with its recording unit, also fixed thereon in its original position, is then allowed to rest on the lower model through the support afforded by the ball rest 69 and the three tracing points, the latter being still locked against vertical movement by their latches 31. The upper model, still remaining detached from the upper arm or support 83 of the articulator, is then brought to the position of central occlusion by locating the three tracing points each at the apex of its respective "Gothic arch" traced on the underlying graphic record.

Figure 8:
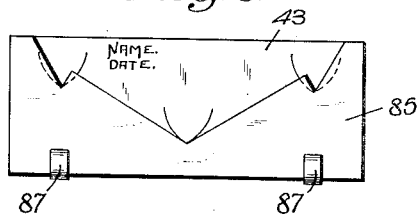
Fig. 8 is a plan of the record carrier and record sheet, with a superimposed templet which may be employed for installing the models in the articulator in their true centric relation.

As an assistance in locating the upper model in true centric position and there maintaining it while attaching it to the articulator arm, a templet or pattern plate of sheet metal 85 (Fig. 8) may be used. This plate may be slipped over the record sheet and there held by any suitable means, as, for example, the spring clips 87, in such position that the apexes of the three angular depressions cut in the plate register with the apexes of the respective underlying "Gothic arches" traced on the sheet. In this position of the plate the tracing points of the recording unit may readily be seated in the apexes of the three depressions referred to and the models located in a relationship to correspond to the true centric position as determined by the graphic record taken in the mouth of the patient. While thus positioned by the templet, the upper model may then be attached to the upper arm of the articulator by plaster of Paris, thereby definitely fixing them in the articulator in their correct centric relationship.

It will be observed that to correctly locate the centric position more than one reference point is needed, and hence the use of a plurality of "Gothic arches" on the record, providing at least two reference points (the apexes of two "Gothic arches") for the centric position. Herein, for greater accuracy, a record is also made of the third intermediate "Gothic arch", the latter also subsequently assisting in better determining the adaptability of the articulator and the accuracy of its adjustment.

With the models now installed in the articulator in true centric relationship, the articulator can be adjusted to reproduce extreme lateral movements by the aid of the graphic record. The arc-shaped path shown by each Gothic arch represents the path of movement which its respective tracing point must follow during movements of the articulator arm to reproduce the true extreme lateral and longitudinal movements of the jaw of the patient, and the termination of these paths represents the extreme positions to which the articulator should be set. Similarly, the readings previously taken of the vertical displacement of the pointers 33 on the scale 39 represent the readings which should be reproduced by the corresponding tracing points and their respective pointers as the articulator arm is moved through corresponding positions of lateral and longitudinal displacement. Accordingly, to set the articulator to reproduce accurately the extreme lateral movement of the patient's jaw, it is only necessary to make use of whatever adjustments are afforded by the particular articulator used until, as the articulator arm is moved, the tracing points follow accurately the paths traced on the record sheet, and the pointers 33 reproduce the readings noted when the record was taken.

In the specific form of articulator illustrated, the parts of the articulator which control the lateral and protrusive movements in one direction are adjusted to cause the tracing point to follow the outside arc-shaped path of the "Gothic arch" which has been traced by that movement, adjustments being also made to limit that movement at the termination of the arc-shaped path. The parts controlling the movement of the articulator arm in the opposite direction are similarly adjusted to cause the opposite tracing point to follow the path represented by the outside of the Gothic arch which had been traced by the corresponding movement of the jaw of the patient. The parts of the articulator controlling the vertical movements of the arm are then adjusted so that the readings on the scale correspond for each opposite jaw movement to the readings taken when the models were in the mouth of the patient.

It may be observed that if the recording unit is attached to the upper model and the record-carrying unit to the lower model, the outside lines traced in the "Gothic arch" represent the path of the true extreme movement, but, if the recording unit is on the lower model and the record-carrying unit on the upper model, the inside lines traced in the "Gothic arch" represent the path of such true extreme movement.

While for illustrative purposes I have described the invention in connection with the making of full dentures, it is to be understood that it may be usefully employed in the making of partial dentures, as well as in bridge work or the mounting of orthodontic models, or for any dental operation where an accurate reproduction of the natural jaw movements is desirable. Also, while I have described the invention in connection with the use of wax models or trial plates, such as are customarily employed in the making of artificial dentures, the models or trial plates serve as supports or attachments for the recording and indicating devices properly and conveniently relating them to the jaws of the patient, and subsequently to the jaws or arms of the articulator, and any supports or attachments for the recording and indicating devices which suitably serve this function may be used in substitution for the specific supports or attachments embodied in the form of the wax models herein described.

While I have herein shown and described for the purpose of illustration one specific embodiment of the invention and one mode of carrying out my improved process, it is to be understood that extensive deviations may be made from the described apparatus and the described method, all without departing from the spirit of the invention.

Claims:

1. A dental device for aiding the reproduction of natural jaw movements usable in connection with models or other jaw-connected supports in a patient's mouth, comprising a recording unit, means for connecting said unit to one support, said unit having a plurality of laterally spaced tracing members removable vertically therein when said unit is in operative position, a record-carrying unit, means for connecting it to the other support, said record carrying unit adapted when in operative position to present to said tracing members a substantially horizontal flat record sheet to receive from each tracing member a graphic record of the path of extreme lateral and horizontal movement of the patient's jaw, and means associated with said tracing members to determine their vertical displacement in moving over the record sheet.

2. In a dental device for aiding the reproduction of natural jaw movements usable with models or other jaw-connected supports in the mouth of a patient, means for recording the extreme lateral movements of the patient's jaw comprising a recording member with means for connecting it to one support, said recording member having a tracer, a record-receiving member with means for connecting it to the other support, and means for relatively adjusting said members to bring them into cooperative relationship, both of said members being withdrawable at will from their supports but replaceable therein in the same relation, thereby to reestablish the adjusted relationship between the recording and record-receiving members.

3. In a dental device for aiding the reproduction of natural jaw movements usable with models or other jaw-connected supports in the mouth of a patient, means for recording the extreme right and left movements of the patient's jaw comprising a recording member with means for connecting it to one support, said member having a plurality of laterally spaced tracing points, vertically movable therein when said member is in operative position, means for locking said tracing points in fixed position, and a record receiving member with means for connecting it to the other support and holding it in cooperative relationship to the recording member.

4. In a dental device for aiding the reproduction of natural jaw movements usable with models or other jaw-connected supports in a patient's mouth, means for recording the extreme lateral movements of the patient's jaw comprising a recording member with means for connecting it to one support, said member having a plurality of tracing points vertically movable therein when said member is in operative position, means for locking said tracing points in fixed position, a record-receiving member with means for connecting it to the other support, and means for adjusting said record-receiving member to bring it into substantial contact with the tracing points of said recording member.

5. In a dental device for aiding the reproduction of natural jaw movements usable with models or other jaw-connected supports in a patient's mouth, comprising a recording device for making a graphic record of the extreme lateral movements of the patient's jaw, with means for connecting said device to one of said supports and a bearing rest between the supports to determine the occlusal plane on which said movements may take place.

6. In a dental device for aiding the reproduction of natural jaw movements usable with models or other jaw-connected supports in a patient's mouth, comprising a recording device for making a graphic record of the extreme movements of the patient's jaw and having a plurality of laterally disposed tracing points, means for connecting said device to one of said supports, a record receiving member presenting a substantially flat surface to said tracing points, and a bearing rest between the supports for determining the occlusal plane from which said movements may take place.

7. In a device of the class described usable with models or other jaw-connected supports in a patient's mouth, the combination with a recording unit having a forwardly extending supporting arm detachably secured to one of said jaw-connected supports and adapted to hold said unit in front of the mouth of the patient, of a flat plate adapted to hold a record sheet, a support for said plate comprising a forwardly extending arm removably and adjustably secured to said other jaw-connected support to hold said plate in recording relation to said recording unit, a plurality of vertically movable tracers carried by said recording unit adapted each to make on said sheet a permanent graphic record of the extreme lateral and forward movements of the patient's jaw and including two laterally spaced tracers and an intermediately positioned one, means to press said tracers against the record sheet, a vertically adjustable bearing rest upon the supports to determine the occlusal plane on which said jaw movements may take place, means to lock said tracers against vertical displacement, means to adjust the recording unit and record holding plate relatively to each other while said tracers are held locked, and means when said tracers are unlocked to indicate the vertical displacement of each laterally positioned tracer for different points in the path traced.

8. In a device of the class described usable with models or other jaw-connected supports in a patient's mouth, the combination with a recording unit having a forwardly extending supporting arm detachably secured to one of said jaw-connected supports and adapted to hold said unit in front of the mouth of the patient, of a flat plate adapted to hold the recording sheet, a support for said plate comprising a forwardly extending arm detachably secured to said other jaw-connected support to hold said plate in recording relation to said recording unit, a plurality of laterally spaced tracers vertically movable in said recording unit adapted each to make on said sheet a permanent graphic record of the extreme right and left lateral and forward movements of the patient's jaw.

9. In a device of the class described usable with models or other jaw-connected supports in a patient's mouth, the combination with a recording unit, of means detachably securing said unit to one of said jaw-connected supports and adapted to hold said unit in front of the mouth of the patient, a plate adapted to hold a recording sheet, means detachably securing said plate to a companion jaw-connected support and holding the same in recording relation to said unit, laterally spaced, vertically movable tracers on said unit adapted to make on said sheet under the movements of the patient's jaw a plurality of permanent graphic records of the extreme lateral and longitudinal movements of the patient's jaw, a bearing rest between the supports to determine the occlusal plane on which said movements may take place, and means to indicate the vertical displacement of the tracers from the central occlusal plane for different points in the path traced thereby.

10. In a device of the class described usable with models or other jaw-connected supports in a patient's mouth, the combination with a recording unit secured to one of said supports, of a record carrying unit secured to the companion support in recording relation to said recording unit, laterally spaced, vertically movable tracers on said unit adapted to make, under the movements of the patient's jaw, a plurality of permanent graphic records of the extreme lateral and longitudinal movements, and means to indicate the vertical displacement of each of the tracers from the central occlusal plane for different points in the path traced thereby.

11. In a device of the class described usable with models or other jaw-connected supports in a patient's mouth, the combination with a recording unit secured to one of said supports, of a record-carrying unit secured to the companion support in recording relation to said recording unit, laterally spaced, vertically movable tracers on said unit adapted to make, under the movements of the patient's jaw in the form of two separated Gothic arches, a plurality of permanent graphic records of the extreme lateral and longitudinal movements, and means to indicate for different points in the path traced by each of said tracers the vertical displacement of the jaw in undergoing said movements.

12. In a device of the class described usable with models or other jaw-connected supports in a patient's mouth, the combination with a recording unit secured to one of said supports, of a record-carrying unit secured to the companion support in recording relation to said recording unit, laterally spaced tracers on said unit adapted to make, each under the movements of the patient's jaw in the form of two separated Gothic arches, a graphic record of the extreme lateral and longitudinal movements, means for establishing the occlusal plane on which said movements may take place, and means to indicate for the different points in the path traced by each of said tracers the vertical displacement of the jaw in undergoing said movements.

13. In a device of the class described usable with models or other jaw-connected supports in a patient's mouth, the combination with a recording unit having a forwardly extending arm detachably secured to one of said jaw-connected supports and adapted to hold said unit in front of the mouth of the patient, of a flat plate adapted to hold a record sheet, a support for said plate comprising a forwardly extending arm removably secured to said other jaw-connected support to hold said plate in recording relation to said recording unit, a plurality of laterally spaced tracers on said recording unit adapted to make a graphic record on said sheet of the movements of the jaw, and means to adjust the recording unit and record holding plate relatively to each other while in the mouth of the patient.

14. In a device of the class described usable with models or other jaw-connected supports in a patient's mouth, the combination with a recording unit having a forwardly extending arm detachably secured to one of said jaw-connected supports and adapted to hold said unit in front of the mouth of the patient, of a flat plate adapted to hold a record sheet, a support for said plate comprising a forwardly extending arm removably secured to said other jaw-connected support to hold said plate in recording relation to said recording unit, tracers carried by said recording unit adapted each to make on said sheet a permanent graphic record of the extreme lateral and forward movements of the patient's jaw and including two laterally spaced tracers and an intermediately positioned one.

15. The method of providing a record of the natural jaw movements with the aid of molds or other jaw-connected supports, which consists in establishing the occlusal plane on which said movements may take place, tracing on a record sheet from the relative movement of the supports while in the mouth of the patient permanent laterally spaced right, left and intermediate records of the extreme paths of lateral and longitudinal movement of the patient's jaws, and simultaneously recording the vertical inclination of both the extreme right and left movements.

16. The method of providing a record of the natural jaw movements with the aid of molds or other jaw-connected supports, which consists in establishing the occlusal plane on which said movements may take place, tracing on a record sheet from the relative movement of the supports while in the mouth of the patient permanent laterally spaced right and left records of the extreme lateral and longitudinal movements of the patient's jaw in the form of right and left Gothic arches, and simultaneously recording the vertical displacement of the jaw from the central occlusal plane corresponding to the extreme lateral and longitudinal positions shown by each laterally spaced record.

17. The method of providing a record of the natural jaw movements with the aid of molds or other jaw-connected supports, which consists in tracing on a suitable record from the relative movement of the supports while in the mouth of the patient a plurality of laterally spaced Gothic arches representing the extreme lateral and longitudinal movements of the patient's jaw, and simultaneously determining the vertical displacement of the patient's jaw with relation to the central occlusal plane corresponding to the extreme positions shown by each of said records.

In testimony whereof, I have signed my name to this specification.

GEORGE P. PHILLIPS.